(12) United States Patent
Ivancic et al.

(10) Patent No.: US 7,930,659 B2
(45) Date of Patent: Apr. 19, 2011

(54) SOFTWARE VERIFICATION

(75) Inventors: Franjo Ivancic, Jersey City, NJ (US);
Aarti Gupta, Princeton, NJ (US); Malay Ganai, Plainsboro, NJ (US); Himanshu Jain, Pittsburgh, PA (US)

(73) Assignee: NEC Laboratories America, Inc., Princeton, NJ (US)

( * ) Notice: Subject to any disclaimer, the term of this patent is extended or adjusted under 35 U.S.C. 154(b) by 599 days.

(21) Appl. No.: 11/422,069

(22) Filed: Jun. 3, 2006

(65) Prior Publication Data
US 2006/0282807 A1    Dec. 14, 2006

Related U.S. Application Data

(60) Provisional application No. 60/687,049, filed on Jun. 3, 2005, provisional application No. 60/725,838, filed on Oct. 12, 2005.

(51) Int. Cl.
*G06F 17/50* (2006.01)

(52) U.S. Cl. .................................................. 716/100

(58) Field of Classification Search ............. 716/5, 100; 717/108
See application file for complete search history.

(56) References Cited

U.S. PATENT DOCUMENTS

| | | | | |
|---|---|---|---|---|
| 5,652,835 A * | 7/1997 | Miller | .............. | 714/38 |
| 5,963,739 A * | 10/1999 | Homeier | ............. | 717/126 |
| 6,643,827 B1 * | 11/2003 | Yang | ................. | 716/2 |
| 7,283,945 B2 * | 10/2007 | Rajan | ............... | 703/17 |
| 7,587,707 B2 * | 9/2009 | Ball et al. | .............. | 717/117 |
| 2003/0204834 A1 * | 10/2003 | Ball et al. | .............. | 717/106 |
| 2005/0166167 A1 * | 7/2005 | Ivancic et al. | ............ | 716/5 |
| 2005/0229044 A1 * | 10/2005 | Ball | ................. | 714/38 |
| 2005/0235257 A1 * | 10/2005 | Ball et al. | .............. | 717/108 |
| 2007/0005633 A1 * | 1/2007 | Ball et al. | .............. | 707/102 |

* cited by examiner

*Primary Examiner* — Jack Chiang
*Assistant Examiner* — Suchin Parihar
(74) *Attorney, Agent, or Firm* — Jeffery J. Brosemer; Joseph Kolodka

(57) ABSTRACT

A system and method is disclosed for formal verification of software programs that advantageously improves performance of an abstraction-refinement loop in the verification system.

4 Claims, 12 Drawing Sheets

Input: An indeasible trace $s_1;...;s_k$

Algorithm:
1: for $i = k$ downto 1
2:  if $s_i$ is of form (assume $\phi_i$)
3:   $local(s_i) = local(s_i) \cup \phi_i$
4:   $seed = \phi_i$
5:   for $j = i-1$ downto 1
6:    if $s_j$ is an assignment statement then
7:     $wp\_seed = WP(seed, s_j)$
8:    else
9:     $wp\_seed = seed$
10:    $local(s_j) = local(s_j) \cup wp\_seed$
11:    $transfer(s_j) = transfer(s_j) \cup \{wp\_seed, seed\}$
12:    $seed = wp\_seed$
13:    if $seed = true$ or $seed = false$ exit inner for loop
14:   end for
15:  end if
16: end for
17: $marked = marked \cup \{s_1\}$

FIG. 3

*FIG. 4* s
1: x = c;
2: y = c + 1;
3: assume (x == m);
4: assume (y != m + 1);

4(b)

s
1: x = c;
2: y = c + 1;
3: if (x == m);
4:   if (y != m + 1);
5:     ERROR:

4(a)

5(a)

| | local(s) | transfer(s) |
|---|---|---|
| 1: | $\{p_2\}$ | $\{(p_2,p_2)\}$ |
| 2: | $\{p_2\}$ | $\{(p_2,p_1)\}$ |
| 3: | $\{p_1\}$ | $\{(p_1,p_1)\}$ |
| 4: | $\{p_1\}$ | |

5(b)

| | local(s) | transfer(s) |
|---|---|---|
| 1: | $\{p_2, p_4\}$ | $\{(p_2,p_2),(p_4,p_3)\}$ |
| 1: | $\{p_2, p_3\}$ | $\{(p_2,p_1),(p_3,p_3)\}$ |
| 3: | $\{p_1, p_3\}$ | $\{(p_1,p_1)\}$ |
| 4: | $\{p_1\}$ | |

FIG. 5

| s | local(s) | transfer(s) |
|---|---|---|
| 1: assume (x < y); | $\{p_1, p_2, p_3\}$ | $\{(p_1,p_1)(p_2,p_2)\}$ |
| 1: assume (y < z); | $\{p_1, p_2\}$ | $\{(p_1,p_1)\}$ |
| 3: assume ( ! (x < z) ); | $\{p_1\}$ | $\{\}$ |

6(b)

```
s
1: assume (x < y);
2: assume (y < z);
3: assume ( ! (x < z) );
```

| s | local(s) | transfer(s) |
|---|---|---|
| 1: $x = c$ | $\{p_2, p_4\}$ | $\{(p_2, p_2), (p_4, p_3)\}$ |
| 2: $y = c + 1;$ | $\{p_2, p_3\}$ | $\{(p_2, p_3), (p_3, p_3)\}$ |
| 3: $if(x = m)$ | $\{p_1, p_3\}$ | $\{(p_1, p_1)\}$ |
| 4: $if(y! = m + 1)$ | $\{p_1\}$ | |
| 5: ERROR: | | |

7(a)

7(b)

| s | Mapping |
|---|---|
| 1: | $\{p_2 : b_1 : p_4 : b_2\}$ |
| 2: | $\{p_2 : b_1 : p_3 : b_2\}$ |
| 3: | $\{p_1 : b_1 : p_3 : b_2\}$ |
| 5: | |

7(d)

Abstraction
1: skip;
2: skip;
3: if($b_2$)
4: if($b_1$)
5: ERROR:

7(e)

Abstraction
1: $b_3 = b_4;$
2: $b_1 = b_2;$
3: $if(b_3)$
4: $if(b_1)$
5: ERROR:

7(c)

Global constraint:
$\neg(b_2 \wedge b_4)$
Local constraint:
$(PC = 1) \rightarrow \neg(b_1 \wedge b_2)$ 7(f)

FIG. 7

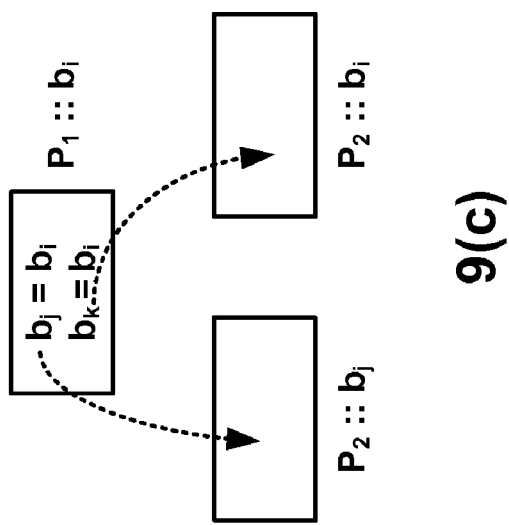
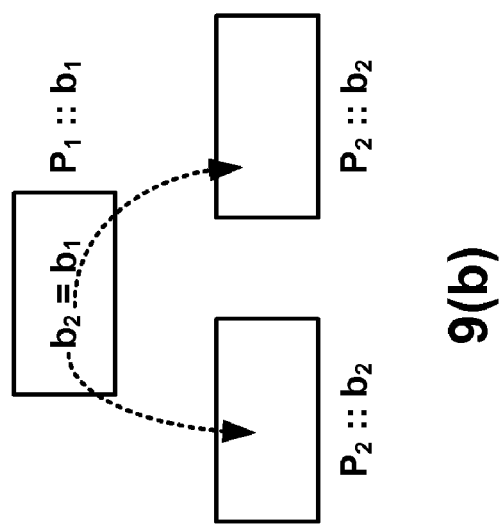
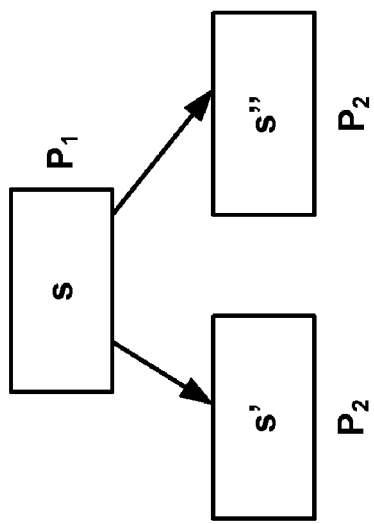
FIG. 9

```
PC
1: if(x<y) {
2:     y=y+1;
...
5:     z=y;
...
10: if (x<z)
11:    ERROR:;
12: }
```

11(a)

```
PC
1: if (*) {
2:     skip;
...
5:     skip;
...
10: if (*)
11:    ERROR:;
12: }
```

11(b)

```
PC
1: assume (x<y);
2: y = y + 1;
...
5: z = y;
...
10: assume (x<z);
```

11(c)

```
PC Invariants
1:
2:  x > y
    x > y-1
5:  x > y-1
..  x > y-1, z = y, x > z-1
10: x > y-1, z = y, x > z-1
11:
12:
```

11(d)

```
PC
1: if (*) {
2:     skip;
...
5:     skip;
...
10: if (b)    [(PC =10) → ¬b]
11:    ERROR:;
12: }
```

```
1. int x=200, y =200;
2. while (x!=0) { x = x - 1; y = y - 1;}
3. assert (y==0);
```

*FIG. 12*

SOFTWARE VERIFICATION

CROSS-REFERENCE TO RELATED APPLICATIONS

This application claims the benefit of U.S. Provisional Application Ser. No. 60/687,049 filed Jun. 3, 2005, and U.S. Provisional Application Ser. No. 60/725,838 filed Oct. 12, 2005, the entire contents and file wrappers of which are incorporated herein by reference as if set forth at length herein. This application is related to U.S. Non-Provisional Utility patent application Ser. No. 11/040,409, entitled "SYSTEM AND METHOD FOR MODELING, ABSTRACTION, AND ANALYSIS OF SOFTWARE," filed on Jan. 21, 2005, the entire contents and file wrapper of which are incorporated herein by reference as if set forth at length herein.

BACKGROUND OF INVENTION

The present invention is generally related to the field of software development and in particular describes techniques for the formal analysis and verification of software.

Model checking is a technique used for the automatic verification of concurrent software systems. It exhibits numerous advantages over other techniques such as simulation, testing, and deductive reasoning, and has been used successfully in practice to verify complex sequential circuit designs and communication protocols. (See E. M. Clarke, O. Grumberg, and D. A. Peled, "Model Checking," MIT Press, 2000.) Of particular advantage, model checking is an automatic technique, and if a design being tested contains an error, the model checking technique produces a counter-example (i.e., a witness of the offending behavior of the system) that can be used to debug the system.

An alternative technique for the verification of software systems—symbolic model checking using binary decision diagrams (BDDs)—potentially provides exhaustive coverage of large state-spaces. Unfortunately, symbolic model checking using BDDs does not scale well in practice.

Yet another alternative technique for the verification of software systems is bounded model checking (BMC) focusing on the search for counter-examples of bounded length only. See, for example, A. Biere, A. Cimatti, E. M. Clarke, M. Fujita, and Y. Zhu, "Symbolic model checking using SAT procedures instead of BDDs," Proc. of the 36th ACM/IEEE Design Automation Conference, pp. 317-20 (1999). This technique effectively translates a problem to a Boolean formula, such that the formula is satisfiable if and only if there exists a counter-example of length k. In practice, k can be increased incrementally starting from one to find a shortest counter-example—if one exists. However, additional reasoning is needed to ensure completeness of the verification when no counter-example exists.

The satisfiability check in the BMC technique is typically performed by what is generally known as a "back-end" SAT-solver. See, e.g., M. K. Ganai, L. Zhang, P. Ashar, and A. Gupta, "Combining strength of circuit-based and CNF-based algorithms for a high performance SAT solver," in Design Automation Conference, 2002; E. Goldberg and Y. Novikov, "Berkmin: A fast and robust SAT solver," in Design Automation and Test in Europe, pages 132-39, 2002; J. P. Marques-Silva and K. A. Sakallah, "GRASP: A search algorithm for prepositional satisfiability," IEEE Transactions on Computers, 48:506-2 1, 1999; and M. Moskewicz, C. Madigan, Y. Zhao, L. Zhang, and S. Malik, "Chaff: Engineering an efficient SAT solver in Design Automation Conference, 2001.

Recently, it has been proposed to apply bounded model checking techniques to the formal verification of software using predicate abstraction in a counterexample-guided refinement flow. See co-pending commonly-assigned Non-Provisional Utility Patent Application Ser. No. 11/040,409, entitled "SYSTEM AND METHOD FOR MODELING, ABSTRACTION, AND ANALYSIS OF SOFTWARE," filed on Jan. 21, 2005, the contents of which are incorporated by reference herein. It would be advantageous to improve the performance of the abstraction refinement loop used in such verification tools. Moreover, it would be particularly advantageous to avoid computationally expensive ways of discovering new predicates such as interpolation.

SUMMARY OF INVENTION

A verification system and method for software is disclosed which advantageously improves performance of an abstraction-refinement loop in the verification system. According to the invention, an embodiment is disclosed which discovers new predicates using weakest pre-condition propagation along infeasible paths. By eliminating most of the calls to any decision procedure when computing the abstraction of the system, the efficiency of the abstraction computation is advantageously increased.

An alternative embodiment—according to the present invention—is disclosed which enables faster model checking of the computed abstract model by sharing abstract variables (or registers), thereby significantly reducing the size of the state-space.

Yet another alternative embodiment is disclosed which attempts to identify early-on whether a certain predicate may be useful in larger parts of the program rather than in a small fraction only. As a result, the verification system is able to make decisions early-on whether a predicate should have a dedicated abstract variable without it being shared out. Advantageously, this significantly reduces the number of necessary abstraction-refinement loops.

Unlike methods and/or techniques of the prior art, The abstraction-refinement approach according to the present invention not only facilitates faster analysis of software models through faster and higher quality software verification, it may also increases the range of applications for which software verification is applicable.

These and other advantages of the invention will become apparent to those of ordinary skill in the art with reference to the following detailed description and the accompanying drawings.

BRIEF DESCRIPTION OF DRAWINGS

FIG. 3 is pseudo-code illustrating the processing performed by predicate localization during refinement;

FIG. 4A is a simple C program and 4B is an example infeasible program trace;

FIG. 5A illustrates the status of local(s) and transfer(s) sets after the first iteration of the refinement processing. Predicates $p_1,p_2$ denote $y \neq m+1$ and $c \neq m$, respectively. FIG. 5B shows new additions to local(s) and transfer(s) in the second iteration. $p_3,p_4$ denote $x=m$ and $c=m$, respectively;

FIG. 6A is an infeasible trace and FIG. 6B illustrates the localization information, where $p_1,p_2,p_3$ stands for x<z,y<z, x<y, respectively;

FIG. 7A is a C program.

FIG. 7B illustrates localization information for the program where $p_1,p_2,p_3,p_4$ denote the predicates y≠m+1,c≠m, x=m,c=m, respectively;

FIG. 7C shows an abstraction with no register sharing. Boolean variable $b_i$ represents the value of $p_i$ in the abstraction;

FIG. 7D illustrates the mapping of predicates in local (s) for each s to the Boolean variables (register sharing);

FIG. 7E illustrates the abstraction with register sharing;

FIG. 7F illustrates the global constraint and Local constraint for abstractions in (c) and (e), respectively;

FIG. 9A shows a statement s and two successors s' and s". Predicate $p_1$ is active at s and $p_2$ is active at s' and s";

FIG. 9B illustrates abstraction with no register sharing;

FIG. 9C illustrates abstraction with register sharing. p::b denotes that predicate p is represented by state variable b at a particular statement;

FIG. 11(a) shows an exemplary C program;

FIG. 11(b) shows an abstraction of the exemplary C program with respect to an empty set of predicates;

FIG. 11(c) shows an infeasible program trace corresponding to the abstract counterexample of 11(b);

FIG. 11(d) shows an compute octagonal invariants at every program location;

FIG. 11(e) shows refined abstraction with the use of invariants wherein the abstract model has no path to the ERROR label;

FIG. 12 shows an exemplary C program for which we wish to verify the assert statement.

DETAILED DESCRIPTION

Figure 1:
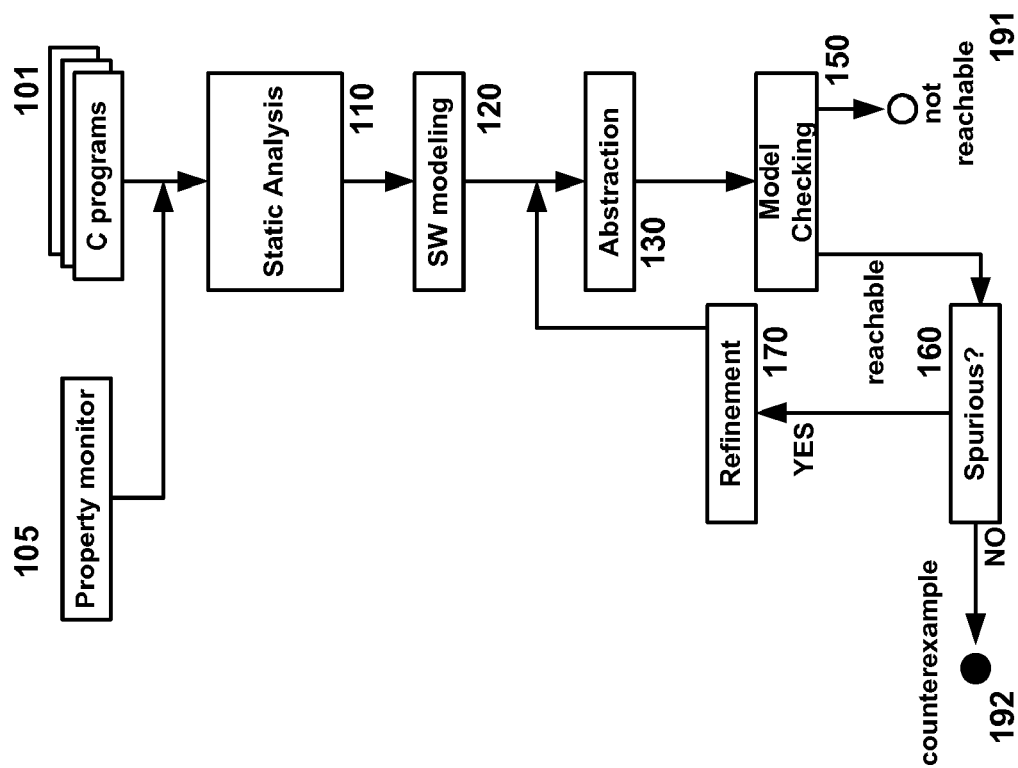
FIG. 1 shows an abstract diagram illustrating processing performed by a software verification system, suitable for practice of an embodiment of the present invention.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative of structures embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including functional blocks, may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, read-only memory (ROM) for storing software, random access memory (RAM), and non-volatile storage. Other hardware, conventional and/or custom, may also be included and may be shown in the FIGs as conceptual only. Their function may be carried out through the operation of program logic, through dedicated logic, through the interaction of program control and dedicated logic, the particular technique being selectable by the implementor as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

Finally, unless otherwise explicitly specified herein, the drawings are not drawn to scale.

FIG. 1 is an abstract diagram illustrating the operation of a verification system, suitable for practicing an embodiment of the present invention. With reference to that FIG. 1, it can be seen that input to the system is a software program 101 and a representation 105 of the property to be checked. The output of the system is a result that either proves that the software program 101 satisfies the property at 191 or provides a counter-example that disproves the property at 192 (or the analysis can terminate without a conclusive result due to resource constraints such as a time-out or memory exhaustion).

A detailed operation of a verification system such as that illustrated in FIG. 1 is described in U.S. Non-Provisional Utility patent application Ser. No. 11/040,409, entitled "SYSTEM AND METHOD FOR MODELING, ABSTRACTION, AND ANALYSIS OF SOFTWARE," filed on Jan. 21, 2005, the contents of which are incorporated herein by reference.

As depicted in FIG. 1, abstraction techniques 130 such as predicate abstraction 132 are utilized in the verification system, which may produce spurious counterexamples, as identified at 160. Such spurious counterexamples need then be prevented by producing a more detailed abstract model using a refinement of the abstraction, at 170. The process can then be iterated until the property is either proved or disproved.

The predicate abstraction technique abstracts data by keeping track of certain predicates on the data. Each predicate is represented by a Boolean variable in the abstract program, while original data variables are eliminated. Application of predicate abstraction to large programs depends crucially on the choice and usage of predicates. If the predicates are tracked gloablly in the program, then the analysis becomes intractable due to the large number of predicate relationships.

In Microsoft's SLAM toolkit, see T. Ball and S. K. Rajamani, "Automatically Validating Tempral Safety Properties of Interface," in 8th International SPIN Workshop on Model Checking of Software, Lecture Notes on Computer Science Vol. 2057, pp. 103-22 (2001), this predicate relationship problem is handled by generating coarse abstractions using techniques such as Cartesian Approximation and the Maximum Cube Length Approximation. These techniques limit the number of predicates in each theorem prover query.

The refinement of the abstraction is carried out by adding new predicates. If no new predicates are found, the spurious behavior is due to inexact predicate relationships. Such spurious behavior is removed by a separate refinement algorithm. On the other hand, the BLAST toolkit introduces the notion of a Lazy Abstraction, where the abstraction refinement is completely demand-driven to remove spurious behaviors. See T. Henzinger, R. Thala, R. Majumdar, and G. Sutre, "Lazy Abstraction," Proceedings of 29th ACM SIGPLAN SIGACT, Symposium on Principles of Programming Languages, pp. 58-70 (2002).

Recent work describes a new refinement scheme based on interpolation, which adds new predicates to some program locations only, which we will call henceforth Localization of Predicates. On average the number of predicates tracked at a program location is small and thus, the localization of predicates enables predicate abstraction to scale to larger software programs.

Figure 2:
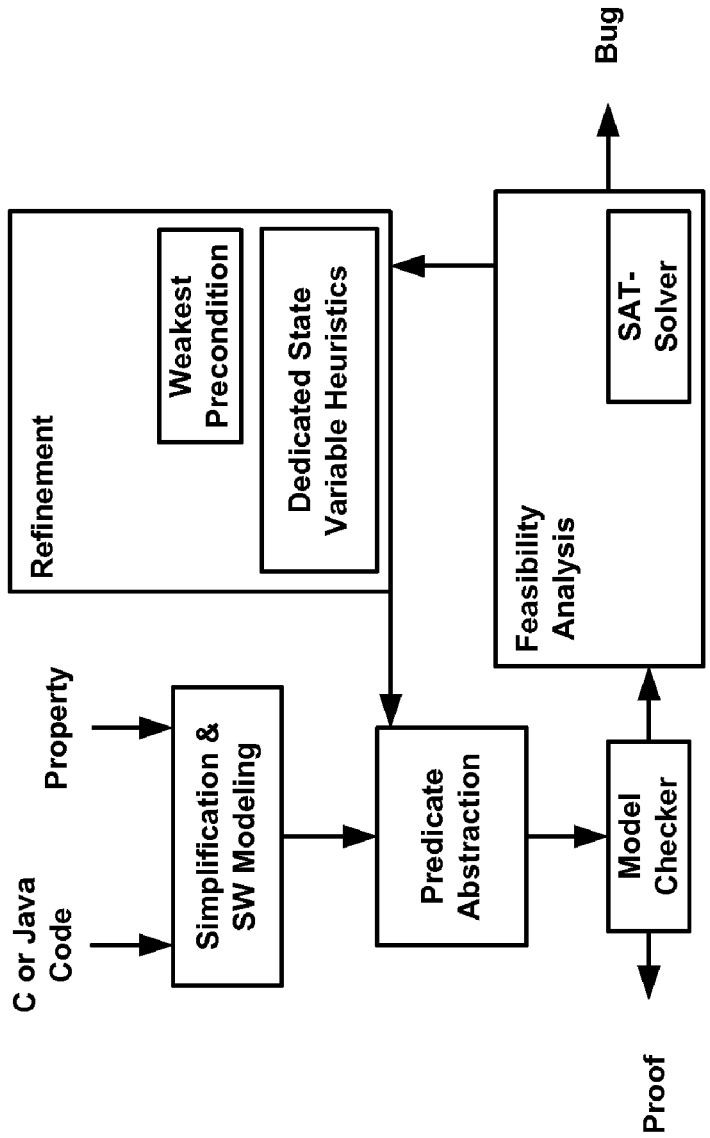
FIG. 2 shows an abstract diagram illustrating how the disclosed abstraction refinement techniques can be incorporated with the software verification processing.

FIG. 2 is an abstract diagram illustrating abstraction-refinement techniques herein disclosed which can be incorporated with software verification processing. First, and unlike BLAST which makes use of interpolation, as depicted in FIG. 2, weakest pre-conditions are used to find predicates relevant at each program location. Given an infeasible trace $s_1; \ldots ; s_k$, the system finds predicates whose values need to be tracked at each statement s in order to eliminate the infeasible trace. For any program location, the system only needs to track the relationship between the predicates relevant at that location. Furthermore, since the system uses predicates based on weakest pre-conditions along infeasible traces, most of the predicate relationships are obtained from the refinement process itself. This enables one to significantly reduce the number of calls to back-end decision procedures leading to a much faster abstraction computation.

Second, the performance of BDD-based model checkers depends crucially on the number of state variables. Due to predicate localization most predicates are useful only in certain parts of the program. Advantageously, state variables corresponding to these predicates can be reused to represent different predicates in other parts of the abstraction, resulting in a reduction of the total number of state variables needed. We refer to this technique as abstraction with register sharing, and—of particular significance—it can reduce the number of state variables, enabling more efficient model checking of the abstract models.

While the above techniques speed up the individual computations and the model checking runs of the abstractions, unfortunately they may result in too many abstraction refinement iterations. This can happen, for example, if the value of a certain predicate needs to be tracked at multiple program locations, i.e., if the predicate is useful globally or at least in some large part of the program. Since the system adds predicates lazily only along infeasible traces, the fact that a predicate is globally useful for checking a property will be learned only through multiple abstraction refinement iterations.

Fortunately, the system can make use of a simple heuristic for deciding when the value of a certain predicate may need to be tracked globally or in a complete functional scope. In particular, if the value of a predicate needs to be tracked in a large scope, then it is assigned a dedicated state variable which is not reused for representing the value of other predicates in the same scope.

Localized Abstraction-Refinement Framework

Consider the software modeling approach set forth in the above-mentioned verification system described in U.S. patent application Ser. No. 11/040,409. vThe software modeling approach is centered around basic blocks. The preprocessing of the source code is performed before the abstraction refinement routine is invoked. A program counter variable is introduced to monitor progress in the control flow graph consisting of basic blocks. Our modeling framework allows bounded recursion through the introduction of a fixed depth function call stack, when necessary, and introduces special variables representing function return points for non-recursive functions.

The formula $\phi$ describes a set of program states, namely, the states in which the value of program variables satisfy $\phi$. The weakest pre-condition of a formula $\phi$ with respect to a statement s is the weakest formula whose truth before the execution of s entails the truth of after s terminates.

We denote the weakest pre-condition of $\phi$ with respect to s by $WP(\phi,s)$. In addition, we let s be an assignment statement of the form, v=e; and $\phi$ be a C expression. Then the weakest pre-condition of $\phi$ with respect to s, is obtained from $\phi$ by replacing every occurrence of v in $\phi$ with e.

Given an if statement with condition p, we write assume p or assume $\neg p$, depending upon the branch of the if statement that is executed. The weakest pre-condition of $\phi$ with respect to assume p, is given as $\phi \wedge p$. As noted earlier, pointer assignments are rewritten early on in our tool chain, thus allowing us to focus on only the above cases.

The weakest pre-condition operator is extended to a sequence of statements by $WP(\phi,s_1;s_2)=WP(WP(\phi,s_2),s_1)$. A sequence of statements $s_1; \ldots ; s_k$ is said to be infeasible, if $WP(true,s_1; \ldots ;s_k)$=false.

For ease of presentation and to facilitate the understanding of the reader, the following material is presented using individual statements while the above system implementation uses a control flow graph consisting of basic blocks. In addition, we employ unsatisfiable cores from SAT-solvers to shorten the infeasible paths to infeasible sub-paths. Oftentimes, this shortens the infeasible traces that we need to consider substantially. Finally, we will sometimes refer to local(s) as the set of active predicates at the statement s.

We define child(s) to denote the set of statements reachable from s in one step in the control flow graph. Each statement s in the program keeps track of the following information: (1) A set of predicates denoted as local(s) whose values need to be tracked before the execution of s. We say a predicate p is active at the statement s, if p∈local(s). (2) A set of predicate pairs denoted as transfer(s). Intuitively, if $(p_i,p_j)$∈transfer(s), then the value of $p_j$ after s terminates is equal to the value of $p_i$ before the execution of s. Formally, a pair $(p_i,p_j) \in$ transfer(s) satisfies the following conditions:

$p_i \in \{\text{True, False}\} \cup \text{local}(s)$,

There exists $s' \in \text{child}(s)$, such that $p_j \in \text{local}(s')$.

If s is an assignment statement, then $p_i = WP(p_j, s)$.

If s is an assume statement, then $p_i = p_j$.

We refer to the sets local(s) and transfer(s) together as the localization information at the statement s. This information is generated during the refinement step, and is used for creating refined abstractions which eliminate infeasible traces. We also define child(s) to denote the set of statements reachable from s in one step in the control flow graph for later use.

As an example, consider the code shown in FIG. 4A and the localization information shown in FIG. 2B. Since $(p_4,p_3) \in \text{transfer}(s_1)$ and $s_1$ is an assignment, it means that $p_4(c=m)$ is the weakest pre-condition of $p_3(x=m)$ with respect to statement $s_1$. The value of predicate $p_4$ is useful only before the execution of $s_1$. After the execution of $s_1$ predicate $p_3$ becomes useful.

Let $s_1; \ldots; s_k$ be an infeasible program trace. If $s_i$ is of the form assume $p_i$ then the weakest pre-condition of $p_i$ is propagated backwards from $s_i$ until $s_1$. When computing the weakest pre-condition of a predicate $p_i$, with respect to a statement $s_j$ of the form assume $p_j$ we propagate the weakest pre-conditions of $p_i$ and $p_j$ separately. That is, we do not introduce a new predicate for $p_i \wedge p_j$. This is done to ensure that the predicates remain atomic. The local and the transfer sets for the various statements are updated during this process. FIG. 3 sets forth pseudo-code illustrating the complete processing performed in predicate localization during refinement.

For example, consider the C program in FIG. 4A and an infeasible trace in FIG. 4B. In addition, assume that initially local(s) and transfer(s) sets are empty for each s. The refinement processing in FIG. 3 is applied to the infeasible trace.

The localization information after the first iteration (i=4) and second iteration (I=3) of the outer loop in the refinement, is shown in FIG. 5A and FIG. 5B, respectively. No change occurs to the localization information for i=2 and i=1, since $s_2$ and $s_1$ do not correspond to assume statements.

If $s_1; \ldots; s_k$ is infeasible, then by definition, WP(true,$s_1; \ldots; s_k$)=false. Intuitively, the atomic predicates in WP(true,$s_1; \ldots; s_k$) appear in local($s_1$) Thus, by finding the relationships between the predicates in local($s_1$), it is possible to construct a refined model which eliminates the infeasible trace.

When an infeasible trace $s_1; \ldots; s_k$ is refined using the processing in FIG. 3, $s_1$ is stored into a set of statements denoted by marked. If a statement s is in the marked set, and the size of local(s) is less than a certain threshold, then the abstraction routine computes the relationships between the predicates in local(s) using SAT-based predicate abstraction. Otherwise, these relationships are determined lazily by detection of spurious abstract states.

Consider the infeasible trace in FIG. 6A and the localization information produced by the refinement processing shown in FIG. 6B. The weakest pre-condition of true with respect to $s_1,s_2,s_3$, is $x<y \wedge (y<z) \wedge \neg(x<z)$. The atomic predicates $x<y, y<z,$ and $x<z$ appear in local($s_1$) as $p_3, p_2,$ and $p_1$, respectively. The abstraction refinement loop needs to discover the fact that $\neg p_1 \wedge p_2 \wedge p_3$ is unsatisfiable in order to eliminate the infeasible trace $s_1;s_2;s_3$.

The refinement processing described in FIG. 3 performs backward weakest precondition propagation for each assume statement in the infeasible trace. However, neither all assume statements nor all assignments may be necessary for the infeasibility of the given trace. Propagating the weakest pre-conditions for all such statements results in an unnecessary increase in the number of predicates active at each statement in the infeasible trace.

We make use of the SAT-based proof of infeasibility of the given trace to determine the statements for which the weakest pre-condition propagation should be done. Thus, the localization information is updated partially, in a way that is sufficient to remove the spurious behavior. The computation of an abstract model using the localization information is described in the next section.

Abstraction Computation

The abstraction of the given C program is described by defining a transition system T. The transition system T=(Q,I,R) comprises a set of states Q, a set of initial states $I \subset Q$, and a transition relation $R(q,q')$, which relates the current state $q \in Q$ to a next-state $q' \in Q$. The abstract model preserves the control flow in the original C program. Both the control flow and the data flow in the abstract model can be encoded symbolically using BDDs.

Let $P=\{p_1, \ldots, p_k\}$ denote the union of the predicates active at various program locations. We first describe an abstraction scheme where each predicate $p_i$ is assigned one unique Boolean variable $b_i$ in the abstract model. The state space of the abstract model is $|L| \cdot 2^k$, where L is the set of control locations in the program. We call this scheme abstraction without register sharing.

Next, we describe a scheme where the number of Boolean variables needed to represent the predicates in P is equal to the maximum number of predicates active at any program location. The size of the abstract model is given by:

$$|L| \cdot 2^{k'}, \text{ where } k'=\max_{1 \leq i \leq |L|} |\text{local}(s_i)|.$$

We call this scheme abstraction with register sharing. Due to the localization of predicates, k' is usually much smaller than k, which enables faster model checking of the abstraction obtained using register sharing.

Abstraction Without Register Sharing. Let PC denote the vector of state variables used to encode the program counter. In abstraction without register sharing each predicate $p_i$ has a state variable $b_i$, in the abstract model. Each state in the abstraction corresponds to the valuation of $|PC|+k$ state variables, where k is the total number of predicates. In the initial state PC is equal to the value of the entry location in the original program. The state variables corresponding to the predicates are initially assigned non-deterministic Boolean values. The transition relation is defined by the next state functions for each state variable.

Due to space limitation, we will only describe the next-state function of the state variables ($b_i$) corresponding to the predicates. Given a statement $s_l$ and a predicate $p_i$ the following cases are possible:

$s_l$ is either an assume statement or an assignment statement that does not assign to any variable in $p_i$. That is, after executing $s_l$ the value of predicate $p_i$. remains unchanged. Thus, in the abstract model the value of the state variable $b_i$, remains unchanged after executing $s_l$. We denote the set of all statements where $p_i$, is unchanged as unc($p_i$).

$s_l$ assigns to some variable in $p_i$. Let $p_j$ denote the weakest pre-condition of $p_i$, with respect to $s_l$. If the predicate $p_j$ is active at $s_l$, that is $p_j \in \text{local}(s_l)$, and $(p_j,p_i) \in \text{transfer}(s_l)$, then after executing $s_l$ the value of predicate $p_i$, is the same as the value of predicate $p_j$ before executing $s_l$. In the abstract model this simply corresponds to transferring the value of $b_j$ to $b_i$, at $s_l$. If the predicate $p_j$ is not active at $s_l$ then the abstract model assigns a non-deterministic Boolean value to $b_i$ at $s_l$. This is necessary to ensure that the abstract model is an over-approximation of the original program.

We denote the set of all statements that can update the value of a predicate $p_i$, as update($p_i$). The set of statements where the weakest pre-condition of $p_i$ is available is denoted by wpa($p_i$). Using the localization information from above, wpa($p_i$) is defined as follows:

$$wpa(p_i) := \{s_l | s_l \in update(p_i) \land \exists p_j . (p_j, p_i) \in transfer(s_l)\}.$$

We use inp($p_i$) to denote the set of statements that assign a non-deterministic value $v_i$ to the state variable $b_i$. This set is defined as update($p_i$)\wpa($p_i$). Let $c_{il}$ denote the state variable corresponding to the weakest pre-condition of predicate $p_i$ with respect to $s_l$. We use $pc_l$ to denote that the program counter is at $s_l$, that is PC=l, and $v_i$ to denote a non-deterministic input variable. The next state function for the variable $b_i$, is then defined as follows:

$$b_i' := \left[\bigvee_{s_l \in unc(p_i)} (pc_l \land b_i)\right] \lor \left[\bigvee_{s_l \in wpa(p_i)} (pc_l \land c_{il})\right] \lor \left[\bigvee_{s_l \in inp(p_i)} (pc_l \land v_i)\right]$$

Note that no calls to a decision procedure are needed when generating the next-state functions. All the required information is gathered during the refinement step itself by means of weakest pre-condition propagation.

Importantly, this provides an efficient way of computing the abstraction for the individual state variables. All the information (local and transfer sets) needed to compute the abstraction is gathered during the refinement step itself, and no additional calls to decision procedures are needed when generating the next-state functions.

Consider the abstraction of the program in FIG. 7A with respect to the localization information given in FIG. 7B. The predicate $p_1(y \approx m+1)$ is updated at statement $s_2$, and its weakest pre-condition $p_2(c \approx m)$ is active at $s_2$, and $(p_2, p_1) \in transfer(s_2)$. So the next state function for the state variable representing $p_1$ is given as follows: $b_1' := (pc_2 \land b_2) \lor ((pc_1 \lor pc_3 \lor pc_4) \land b_1)$. The other next state functions are given as follows: $b_2' := b_2, b_4' := b_4$, and $b_3' := (pc_1 \land b_4) \lor ((pc_2 \lor pc_3 \lor pc_4) \land b_3)$. The resulting abstraction is shown in FIG. 7C. For simplicity the control flow is shown explicitly in the abstraction.

Global constraint generation: The precision of the abstraction can be increased by finding the relationships between the predicates in local(s) for some s. For example, in FIG. 7B the relationship between the predicates in local($s_1$) results in a global constraint, $b_2 \leftrightarrow \neg b_4$. This constraint holds in all states of the abstract model of FIG. 7C as the Boolean variables $b_2$ and $b_4$ always represent the same predicate throughout the abstraction without register sharing. The abstraction without register sharing given in FIG. 7C combined with the global constraint in FIG. 7F is sufficient to show that the ERROR label is not reachable in the C program given in FIG. 7A. Note that we could have simplified the computation here by recognizing that $p_4 = \neg p_2$, which we omit for presentation purposes only.

The constraint generation is done only for some of the statements which are marked during the refinement (FIG. 3, line no. 17). We use SAT-based predicate abstraction to find the relationships between the predicates in local(s) for such statements. This is the only time we use any decision procedure other than checking for the feasibility of traces. Due to the computational cost of enumerating the set of solutions, we only perform this computation for very small sets of predicates. Other relationships are then discovered on demand based on spurious abstract states.

Abstraction With Register Sharing. In abstraction with no register sharing, the state-space of the abstract model is $|L| \cdot 2^{|P|}$, where P is the set of predicates, and L is the set of locations in the given program. Thus, when the number of predicates is large, model checking of the abstraction can become a bottleneck even with a symbolic representation of the state space. We make use of the locality of predicates to speed up the model checking of the abstraction. This is done by reducing the number of (Boolean) state variables in the abstraction. The fact that each state variable in the abstract model is only locally useful can be used to represent different predicates in different parts of the program using the same state variable. We call the reuse of state variables in the abstract model register sharing.

Consider the C program shown in FIG. 7A and the localization information shown in FIG. 7B. The abstraction of this program with no register sharing in FIG. 7C, contains four state variables, one for each predicate. However, the number of predicates active at any program statement is $\max_{1 \leq i \leq 4} |local(s_i)| = 1$. Intuitively, it should be possible to create an abstraction with just two state variables.

The predicates $p_2, p_4$ are active at program location 1, so we introduce two Boolean variables $b_1, b_2$, to represent each of these predicates, respectively. After the execution of $s_1$, predicate $p_4$ is no longer active, and the state variable $b_2$ can be used to represent some other predicate. Predicate $p_3$ becomes active at $s_2$, so we can reuse the abstract variable b to represent $p_3$ at $s_2$. In a similar fashion, $b_1$ can be reused to represent predicate $p_1$ at program locations $s_3$ and $s_4$. We use p:b to denote that the predicate p is represented by the state variable b. The mapping of active predicates at each program location to the state variables is given in FIG. 7D.

The abstraction with register sharing is obtained by translating the predicate relationships in transfer(s) for each s, according to the mapping discussed above. Continuing our example, $(p_4, p_3) \in transfers(s_1)$ in FIG. 7B, the value of the state variable representing $p_4$ at $s_1$ must be transferred to the state variable representing $p_3$ afterwards. Since both $p_4$ and $p_3$ are represented by the same state variable $b_2$, the abstraction for $s_1$s does not alter the value of $b_2$. The abstraction using only two state variables ($b_1, b_2$) is shown in Fig ??(e). The skip statement means that the values of the state variables $b_1$ and $b_2$ remain unchanged for that statement.

Mapping predicates to state variables: Recall, that p= $\{p_1, \ldots, p_k\}$ denotes the set of predicates. Let B=$\{b_1, \ldots, b_l\}$ be the set of state variables in the abstraction, where l equals the maximum number of active predicates at any program location. For every statement s, the predicates relevant at s are mapped to unique state variables in B. Let map be a function that takes a statement s and a predicate p as arguments. If $p \in local(s)$, then the result of map(s,p) is a state variable $b \in B$; otherwise, the result is $\bot$.

Recall that child(s) denotes the set of statements reachable from s in one step in the control flow graph. The constraints to be satisfied by map are as follows:

Two distinct predicates which are active together at the same statement should not be assigned the same Boolean variable in the abstraction for that statement.

$$\forall s \forall p_i, p_j \in local(s)[p_i \neq p_j \rightarrow map(s,p_i) \neq map(s,p_j)]$$

Figure 8:
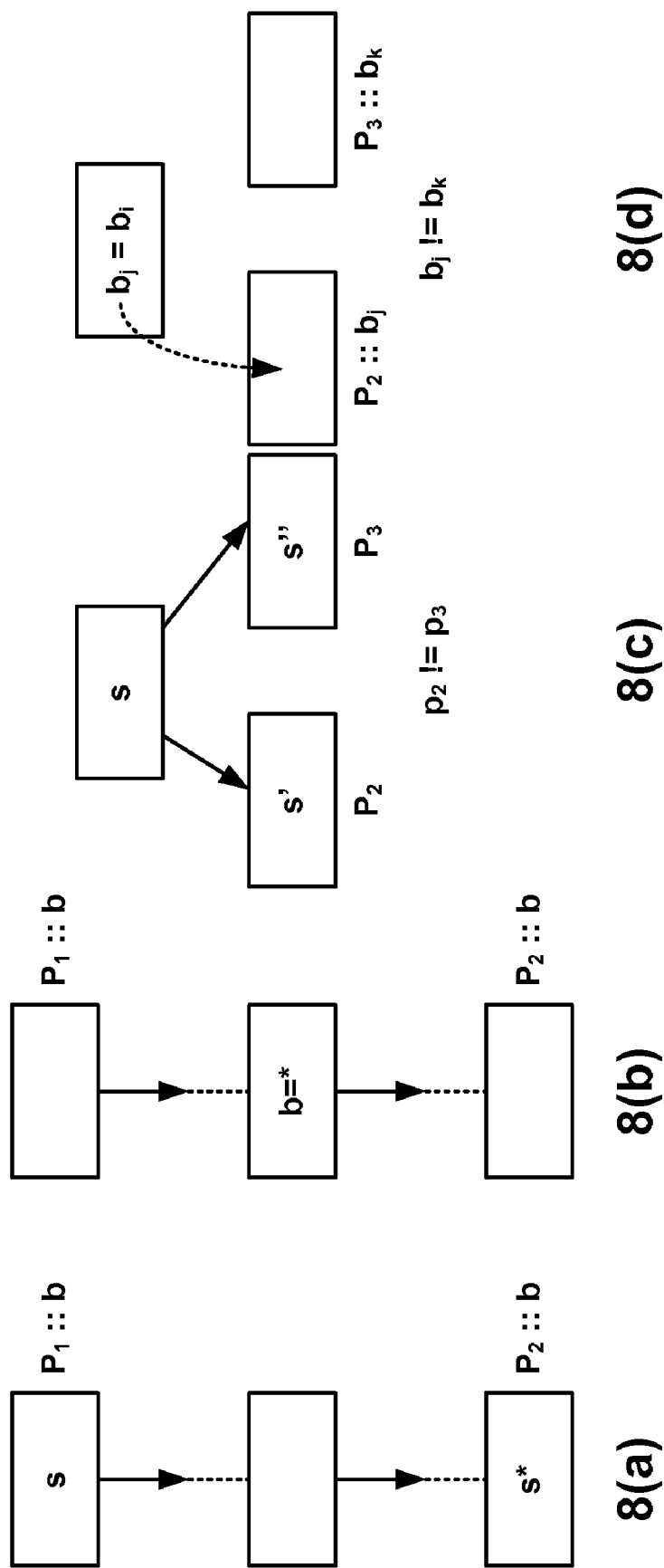
FIG. 8A shows a Boolean variable b used to represent two distinct predicates $p_1$ and $p_2$ on the same path.
FIG. 8B shows a boolean variable set to a *(non.deterministic value) between s and s'.
FIG. 8C shows statement s and two successors s' and s". Predicates $p_1,p_2,p_3$ are active at s,s',s", respectively.
FIG. 8D illustrates abstraction with no register sharing, where $(p_1,p_2) \in$ transfer(s). Predicate $p_1,p_2$ are mapped to $b_i,b_j$, respectively, in the abstraction. Predicate $p_3 \neq p_2$ should not be mapped to $b_j$ for safe abstraction i.e., an over approximation of the original program.

Consider statement s and $(p_1, p_2) \in transfer(s)$. By definition there exists $s' \in child(s)$ where $p_2$ is active, that is $p_2 \in local(s')$. This case is shown in FIG. 8A. Suppose the predicate $p_1$ is mapped to $b_i$ in s and $p_2$ is mapped to $b_j$ in s'. The abstraction for the statement s will assign the value of $b_i$ to $b_j$. So $b_j$ should not be used to represent a predicate $p_3$, where $p_3 \approx p_2$, in any other successor of s. This is because there is no relationship between the value of the predicate $p_1$ at s and the predicate $p_3$ at s". This constraint is shown in FIG. 8B.

In an implementation the map function can be computed incrementally, as new predicates are discovered. Suppose during refinement a new predicate p gets added to local(s) for some s. In order to find a state variable to represent the value of p at s, we first check if some existing state variable can be used without violating the constraints described above. If no existing state variable can be used, we introduce a new state variable for representing the value of p at s.

Consider the scenario shown in FIG. 9A. Predicate $p_1$ is active at s, and $p_2$ is active at s',s"∈child(s). In the abstraction with no register sharing there are unique Boolean variables $b_1, b_2$ assigned to $p_1, p_2$, respectively. Suppose that $(p_1, p_2)$ ∈transfer(s). In the next state function for predicate $p_2$, that is $b_2$' the value of $b_1$ is copied to $b_2$' at s (FIG. 9B).

In abstraction with register sharing it is possible that the predicate $p_2$ is represented by distinct Boolean variables $b_j$, $b_k \in B$ at the statements s', s", respectively. Thus, the value of the Boolean variable representing $p_1$ at $s_1$, say $b_i$, must be copied to both $b_j$ and $b_k$ at $s_1$ (FIG. 9C). These relationships are tracked at each statement s by the set abs(s).

We now describe the processing performed which creates an abstraction in the presence of register sharing. Let abs(s) be a set of Boolean pairs associated with each statement s. Intuitively, if $(b_l, b_m) \in abs(s)$, then in the abstraction the value of $b_m$ after s terminates is equal to the value of $b_l$ before the execution of s. Formally, abs(s) is defined as follows:

$$ab(s) := \{(b_l, b_m) \exists (p_i, p_j) \in transfer(s). b_l = map(s, p_i)$$
$$\exists s' \in child(s). b_m = map(s', p_j)\}.$$

Given a Boolean variable b and a statement i, the following cases are possible:

- $s_l$ updates the value of $b_i$. That is, there exists a $b_j \in B$ such that $(b_j, b_i) \in abs(s_l)$. We denote the set of all statements which update $b_i$, as update($b_i$) The function rhs($s_l, b_i$) returns the Boolean variable which is assigned to $b_i$, in the statement $s_l$.
- $s_l$ assigns a non-deterministic value to $b_i$ The set of all such statements is denoted by nondet($b_i$). In order to understand the use of this set, consider a Boolean variable b which is used to represent two distinct predicates $p_1$ and $p_2$ on the same path. Assume that b is not used to represent any other predicate between the statements s and s'. Since $p_1$ and $p_2$ are not related, the value of b when it is representing $p_1$ should not be used when b is representing $p_2$. So b is assigned a non-deterministic value between the path starting from s to s'. This is necessary to ensure that the abstraction is an over-approximation of the original program. This case is shown in FIG. 8A and FIG. 8B.
- The value of $b_i$ is a don't-care at statement $s_l$. The value of $b_i$ is a don't care for all the statements which are not present in update($b_i$) or nondet($b_i$). In such cases, we set the value of $b_i$, to false at these statements, in order to simplify its conjunction with the program counter variable to false. This simplifies the overall transition relation.

Given the above information the next state function for the variable $b_i$, is defined as follows (we use an input $v_i$ for introducing non-determinism and $pc_l$ to denote PC=l):

$$b'_i := \left[\bigvee_{s_l \in update(b_i)} (pc_l \wedge rhs(s_l, b_i))\right] \vee \left[\bigvee_{s_l \in nondet(p_i)} (pc_l \wedge v_i)\right].$$

Local constraint generation: The abstraction can be made more precise by relating the predicates in local(s) for some s. For example, in FIG. 7B the predicates in local($s_1$) satisfy the constraint that $p_2 = \neg p_4$. In order to add this constraint to the abstraction, we need to translate it in terms of the Boolean variables. The mapping given in FIG. 7D assigns Boolean variables $b_1, b_2$ to $p_2, p_4$, at $s_1$ respectively. This leads to a constraint (PC=1)→($b_1 \leftrightarrow \neg b_2$). This is called a local constraint as it is useful only when PC=1. We cannot omit the PC=1 term from the constraint as this would mean that $b_1 \leftrightarrow \neg b_2$ holds throughout the abstraction. The abstraction with register sharing in FIG. 7E combined with the local constraint in FIG. 7F is sufficient to show that the ERROR label is not reachable in the C program given in FIG. 7A.

Dedicated State Variables

Register sharing enables the creation of abstract models with as few Boolean variables as possible which enables more efficient model checking of the abstractions. However, register sharing might also result in a large number of refinement iterations as described in the following. Consider a sequence S E of statements from s to s', which does not modify the value of a predicate p. Assume that p is localized at the statements s, s', but not at any intermediate statement in S E. In abstraction with register sharing, it is possible that p is represented by two different Boolean variables $b_1$ and $b_2$ at s and s' respectively. Because the value of p remains unchanged along S E, the value of $b_1$ at s should be equal to the value of $b_2$ at s'. If this is not tracked, we may obtain a spurious counterexample by assigning different values to $b_1$ at s and $b_2$ at s'. This leads to a refinement step, which localizes the predicate p at every statement in S E, to ensure that the value of predicate p does not change along S E in subsequent iterations. We should note that such behavior is handled in the abstraction without register sharing approach through the use of the unchanged set denoted by unc described earlier.

If p is discovered frequently in different parts of the program through various spurious counterexamples, then using the abstraction with register sharing will lead to many abstraction refinement iterations. This problem can be avoided, if p is represented by exactly one Boolean variable b in a large scope of the abstraction. This is because the value of b will not be changed by any statement in S E, and thus, the value of b at s' will be the same as that at s. We call a Boolean variable which represents only one predicate for a large scope a dedicated state variable. The next state function for a dedicated state variable b is computed using the equation above.

Hybrid approach: Initially, when a predicate is discovered it is assigned a Boolean variable, which can be reused for representing different predicates in other parts of the abstraction. If the same predicate is discovered through multiple counterexamples in the various parts of the program, then it is assigned a dedicated Boolean variable for a global or functional scope of the program depending on the variables used in the predicate.

The decision about when to assign a dedicated Boolean variable to a predicate is done by making use of the following heuristic.

For each predicate p, let usage(p, i) denote the number of statements where p is localized in the iteration number i of the abstraction refinement loop. It is defined as |{s|p∈$local_i$(s)}|, where we index the local set with i to show that it changes with i. If usage(p, i) exceeds a certain user-defined threshold TH, then p is assigned a dedicated Boolean variable. If TH=0, then every predicate will be assigned a dedicated state variable as soon as it is discovered. This is similar to performing abstraction with no register sharing for all state variables. On the other hand, if TH=|L|+1, where |L| is the total number of statements in the program, then none of the predicates will be assigned a dedicated state variable. This allows complete reuse of the abstract variables, which is similar to abstraction with register sharing. For any intermediate value of TH we have a hybrid of abstraction with and without register sharing.

In the hybrid approach, it is possible to have global constraints on the dedicated state variables. This saves refinement iterations where the same constraint is added locally in various parts by means of counterexamples. We can still have local constraints on the state variables which are reused. Furthermore, we hope to discover as early as possible whether a predicate should be given a dedicated state variable by having a low threshold for the early iterations of the abstraction refinement loop, which increases as the number of iterations increases. Predicting early on that a predicate may need a dedicated state variable reduces the number of abstraction refinement iterations substantially.

Staticaly Computed Invariants Inside Predicate Abstraction and Refinement Loop

Figure 10:
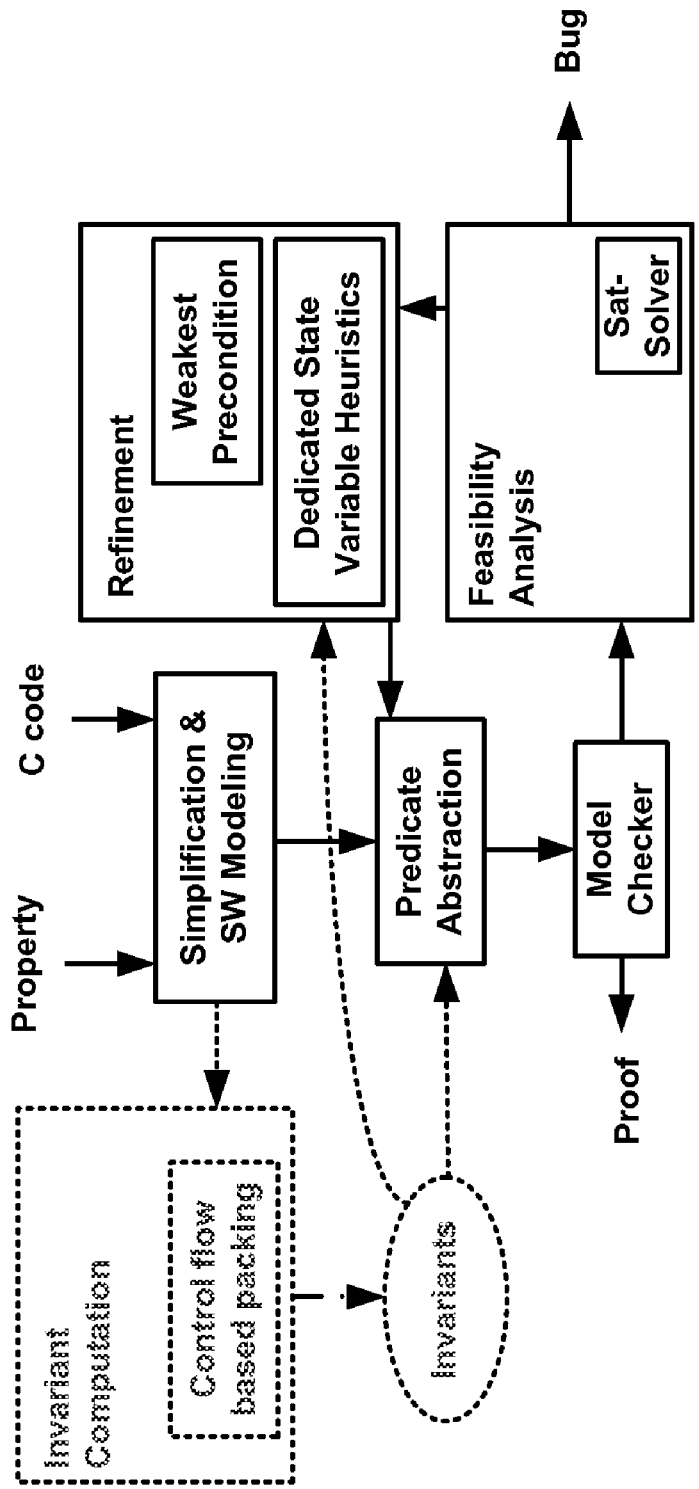
FIG. 10 shows an abstract diagram illustrating how an alternative embodiment of the disclosed abstraction refinement techniques can be incorporated with the software verification processing.

With these teachings in place, we note that additional methods of predicate abstraction may be successfully employed by the method of the instant application. In particular, using statically computed invariants inside a predicate abstraction and refinement loop offers further advantages of our method(s). FIG. 10 is a block diagram depicting the relationship(s) between this preferred embodiment, and the one shown earlier in FIG. 2.

As should now be apparent to those skilled in the art, predicate abstraction is a powerful technique for extracting finite-state models from often complex source code. It advantageously abstracts data by keeping track of certain predicates on the data. As preferably implemented, each predicate is represented by a Boolean variable in an abstract program, while any original data variables are eliminated. In most predicate abstraction and refinement-based tools, spurious behavior in the abstract model is removed by adding new predicates or making the relationships between existing predicates more precise. Thus, even the information that can be discovered efficiently using other abstract domains (e.g., numerical abstract domains) may be only learned through multiple refinement iterations in the form of new predicates.

A number of the techniques in the prior art so-far described employ over-approximations of the most precise abstract models to ensure scalability of the individual steps in abstraction-refinement. However, over-approximations introduce more spurious counterexamples resulting in an increase in the number of refinement iterations.

And even though the refinement process may be completely automatic, a large number of refinement iterations can make the entire predicate abstraction and refinement loop inefficient, and often intractable. Consequently—and according to the teachings of the present invention—we strengthen the concrete transition relation at a given program location l using invariants that hold at the program location l.

In certain predicate abstraction approaches (not using invariants) each program location is abstracted in isolation, that is, no information is available about the variables read at that location. Strengthening of the concrete transition relation using invariants provides additional relationships between the variables read at a program location. Thus, the abstract model produced using the strengthened transition relation can be more precise leading to fewer spurious counterexamples as compared to standard approaches.

We may show the efficacy of this approach by incorporating an abstract domain, namely the octagon abstract domain, into the predicate abstraction and refinement loop. Octagonal invariants are invariants of the form $\pm x \pm y \leq c$, where x and y are numerical program variables and c is a numerical constant. These invariants can be computed efficiently by the octagon abstract domain. The octagon abstract domain has been used within the Astr'ee analyzer, and was shown instrumental in reducing the number of false alarms when detecting runtime errors in critical embedded software.

In practice, we advantageously employ the following principles when using octagonal invariants.

Invariant Generation: Tracking octagonal relationships between a large number of program variables is expensive. In Astr'ee, the set of program variables is clustered into various sets of related variables known as octagon packs. The octagonal relationships between all octagon pack variables are computed separately for each octagon pack. The size of each octagon pack is kept small, so that the computation of octagonal relationships between the variables of an octagon pack does not become a bottleneck. Advantageously, we describe a new clustering strategy which attempts to create octagon packs containing program variables which may likely appear in predicates and their weakest pre-conditions through abstraction refinement.

Invariant Selection: Those skilled in the art will readily recognize that after invariant generation there can be many octagonal relationships that hold at each program location. Unfortunately however, using all invariants that hold at program location l to strengthen the transition relation at program location l may not be beneficial. This is because providing too many additional relationships in form of invariants can potentially increase the burden on the decision procedure used for abstraction computation and simulation of abstract counterexamples. Advantageously we describe a heuristic for selecting the invariants that are used for strengthening the transition relation at a given program location.

According to the present invention, the use of octagonal invariants in the predicate abstraction and refinement loop lead to a consistent reduction in the total number of predicates, maximum number of predicates tracked at a given program location, the overall verification time as compared to alternative techniques.

Further related work: We note that the idea of using statically computed invariants during abstraction has been noted before [See, e.g., 5, 23, 9]. Yet while it was noted that using invariants during abstraction can produce abstract model with fewer transitions and less reachable states, however, the invariants described to date during abstraction needed to be supplied by the user. According to the present invention, we disclose an invariant generation technique.

Constraints of the form $\pm x \pm y \leq c$ arise frequently in software verification. It has been observed that a number of the linear arithmetic constraints arising in software verification have the form x−y<c, while a number of the queries that arise during the refinement process of other methods are of the form $\pm x \pm y \leq c$ However, none of the predicate abstraction-refinement tools has used (octagonal) invariants during verification as now taught and described in the present invention.

Motivating Example

We use a known counterexample guided abstraction and refinement loop to check safety properties (such as unreachability of error labels) in C programs. For example, if we consider the C program shown in FIG. 11(a) with variables x, y, z of type int. Assume further that the statements not shown do not affect the variables x, y, z.

Predicate abstraction of the C program with respect to an empty set of predicates is shown in FIG. 11(b). Observe that the control flow in both the abstract model and the C program is the same. Since the initial set of predicates is empty we cannot track the value of the conditions at program locations 1 and 10 in the abstract model precisely. Thus, the conditions at program locations 1 and 10 in the C program are replaced by non-deterministic choice (represented as * in this FIG. 11(b)) in the abstract model.

All assignments in the C program are replaced by skip statements in the abstract model. A skip statement at a program location l in the abstract model means that the statement at program location l in the C program has no effect on the predicates being tracked in the abstract model. The ERROR label in the C program is preserved in the abstract model.

Model checking of the abstraction shown in FIG. 11(b) produces an abstract counterexample which goes through all program locations starting from 1 to 11 (ERROR). Since the abstract counterexample may or may not correspond to a real bug in the C program, it is checked if there is a feasible sequence of statements in the original C program leading to the ERROR label and having the same control flow as the abstract counterexample. The feasibility check is carried out using a decision procedure. For the abstract counterexample produced by model checking the abstraction in FIG. 11(b), the corresponding sequence of statements in the C program is shown in FIG. 11(c). The assume statement shows which branch of the if statement was taken in the abstract counterexample.

Consider the program trace shown in FIG. 11(c). The relationship $x>y$ holds at the program location 2 (before $y=y+1$ is executed). Variable y is incremented at program location 2, thus, $x>y-1$ holds after program location 2 (after $y=y+1$). Variable z is assigned y at location 5, so $x>z-1$ holds after program location 5. Since x, y, z are integers, we have $x\_z$ after program location 5. The relationship $x\_z$ contradicts with the assume statement at location 10 ($x<z$). Thus, the trace in FIG. 11(c) is an infeasible trace.

In order to eliminate the infeasible trace shown in FIG. 11(c) the refined abstract model needs to track the value of the condition $x<z$ at program location 10 precisely, as it guards the ERROR label. This is done by introducing new predicates in most tools. Using known techniques, the infeasible trace shown in FIG. 11(c) can be removed by tracking exactly one predicate at each program location from 1 to 10. Such techniques will track the following relationships in the abstract model: $x<y+1$ is false at program location 2 (before $y=y+1$), $x<y$ is false from location 3 till 5, $x<z$ is false from location 6 to location 10. Note that even though three new predicates ($x<z, x<y, x<y+1$) are introduced only the value of one predicate needs to be tracked at each program location. The drawback of this technique is that predicate relationships need to be tracked for the entire infeasible trace, even at the program locations (3,4,6,7,8,9) not directly involved in the infeasibility of the program trace.

We may now show how the use of efficiently computable invariants (such as octagonal invariants) can improve the above techniques. The two variable invariants that hold at various program locations of the program in FIG. 11(a) are shown as annotations in FIG. 11(d). For example, at the program location 10 the relationships $x>y-1$, $x>z-1$, $y=z$ hold. The invariants shown can be written as conjunctions of octagonal invariants and can be computed using the octagon abstract domain. For example, $x>y-1$ can be written as $-x+y\leq 2$, and $y=z$ is equivalent to a conjunction of two octagonal invariants $y-z\leq 0$ and $-y+z\leq 0$. The advantages of using the invariants in the predicate abstraction and refinement loop are given below.

Reduction in the length of infeasible trace fragments needing refinement: Let us consider the use of invariants during the detection of infeasible traces. Consider the program trace shwn in FIG. 11(c). Without the use of invariants the trace is infeasible due to statements at location 1, 2, 5, 10. The refinement procedure generates new predicates by looking at all four statements. However, with the aid of invariants the statement at location 10 is itself infeasible because the invariant $x>z-1$ holds at location 10 (see FIG. 11(d)). Thus, the refinement procedure only needs to look at a fragment of the trace consisting of only the statement at program location 10.

Reduction in the number of predicates needed for refinement: Without the use of invariants, other refinement schemes track the value of at least one predicate at each program location from 1 to 10. Using invariants, the refinement procedure only looks at program location 10 (PC=10) and the invariants that hold at that location. The condition $x<z$ of the assume statement at location 10 of the infeasible trace is introduced as a predicate and its value is tracked only at PC=10 in the refined abstract model shown in FIG. 11(e). The Boolean variable b represents the predicate $x<z$ in the abstract model. The constraint $\neg b$ holds at PC=10 as the invariant $x>z-1$ holds at PC=10 in C program. With the aid of the constraint (PC=10)$\rightarrow \neg b$ the abstract model of FIG. 11(e) has no path to the ERROR label. Octagon abstract domain alone is precise enough to show that ERROR label is unreachable in FIG. 11(a).

However, this is not always the case. If the condition at PC=10 in FIG. 11(a) is $2x<z+y$ (not in octagonal form), then the octagon abstract domain cannot show that ERROR label is unreachable. Predicate abstraction and refinement loop can still use the octagonal invariants and show the unreachability of ERROR label using the abstract model shown in FIG. 11(e), with b representing the predicate $2x<z+y$. One reason to combine invariants with predicate abstraction, especially in the context of weakest pre-condition based refinement is the problem of handling loops efficiently. Often, these techniques model multiple loop unwindings through the use of several related predicates that correspond to different loop unwindings. Instead, certain classes of loop invariants can be computed efficiently, and their usage inside the abstraction refinement loop can lead to quicker convergence in presence of loops.

Example: In the C code below we wish to verify the assert statement. The use of the loop invariant $x=y$ in the abstraction refinement loop can eliminate the need of numerous predicates of the form $x=200,y=200, \ldots ,x=0,y=0$ which arise when using the weakest pre-condition based refinement. Advantageously, the invariant $x=y$ can be discovered using the octagon abstract domain.

1. int x=200, y=200;
2. while (x !=0) {x=x−1; y=y−1;}
3. assert (y==0);

Transition Relation Strengthening We operate on a control flow graph of the given program, after various pre-processing steps performed by the F-SOFT tool. In particular, we let b denote a basic block in the control flow graph. It can contain multiple assignments or an assume statement describing which branch of a condition is taken. Let Tb(V, V') denote the transition relation of basic block b, where V, V' denote the state of program variables before and after executing b, respectively.

An invariant $l_b$ at basic block b is a Boolean formula over V. Invariant $l_b$ evaluates to true whenever the program counter is at b in any execution of the program. Suppose we have precomputed a particular set of invariants at each basic block. Let $Cl_b(V)$ denote the conjunction of various invariants that hold at basic block b. The idea of transition relation strengthening is to use $Cl_b(V) \land T_b(V,V')$ instead of $T_b(V,V')$ when analyzing b. We refer to $Cl_b(V) \land T_b(V,V')$ as the strengthened transition relation at basic block b and denote it by $ST_b(V,V')$.

The strengthened transition relation $ST_b(V,V')$ can be used inside the predicate abstraction and refinement loop by using $ST_b(V,V')$ in place of $T_b(V,V')$. We describe this process in more detail below.

Predicate abstraction computation: In predicate abstraction, the variables of the concrete program are replaced by Boolean variables that correspond to a predicate on the variables in the concrete program. These predicates are functions that map a concrete state $V \in S$ into a Boolean value, where S denotes the set of program states.

Let $P = \{\pi_1, \ldots, \pi_k\}$ be the set of predicates over the program variables. When applying all predicates to a specific concrete state, one obtains a vector of Boolean values, which represents an abstract state W. We denote this function by $\alpha(V)$. It maps each concrete state into an abstract state and is called an abstraction function.

The predicate abstraction of a basic block b is carried out using existential abstraction, i.e., the abstract model can make a transition from an abstract state W to W' iff there is a transition from V to V' after executing basic block b and V is abstracted to W and V' is abstracted to W'.

We denote the abstract transition relation obtained by predicate abstraction of basic block b with respect to predicates in P as $\hat{T}_b(W,W')$ $$\hat{T}_b := \{(W,W') | \exists V, V' \in S : (\alpha(V) = W) \land T_b(V,V') \land (\alpha(V') = W')\} \quad (1)$$

Note that the above equation computes the abstraction of b with respect to predicates in P in isolation. The term isolation means that no relationships are assumed between the variables in V during abstraction. However, certain relationships may hold between the variables in V when the program execution reaches b.

In current predicate abstraction tools, such relationships will be discovered on-demand through multiple refinement iterations, in the form of new predicate relationships in the abstract model. Many of these relationships can however be computed efficiently in the form of invariants.

The aim of strengthening is to provide such relationships in the concrete program itself, rather than discovering them in form of predicate relationships in the abstract model. Let $\widehat{ST}_b(W,W0)$ denote the abstract transition relation obtained by using the strengthened transition relation for basic block b, that is, replacing $Tb(V,V0)$ by $STb(V,V0)$ in Equation 1. The following assertion states that predicate abstraction using the strengthened transition relation for b can be more precise than predicate abstraction of b in isolation.

Assertion. $\forall b : \widehat{ST}_b(W,W') \subseteq \hat{T}_b(W,W')$ This assertion follows from the definition of strengthened transition relation and Equation 1. Consider a concrete program C. Using the strengthened transition relation for each basic block in C during verification does not add any new behaviors to C or remove any existing behaviors from C. This is because strengthening provides invariants which are implicit in C.

Let $\hat{C}$ denote the predicate abstraction of C obtained by using $\widehat{ST}_b(W,W')$ for every basic block b in C. The following assertion then states the soundness of predicate abstraction obtained using the strengthened transition relation.

Assertion. Abstraction soundness: $\hat{C}$ is a conservative over-approximation of C.

Simulation of program traces: If the property is violated in the abstract model, we obtain an abstract counterexample from the model checker. In order to check if an abstract counterexample corresponds to a concrete counterexample, a simulation step is performed. By ensuring that the control flow in the concrete program is preserved in the abstract model, an abstract counterexample can be mapped back to a sequence Tr of basic blocks $b_1, \ldots b_k$ in the concrete program, where $b_1$ is the entry block and $b_k$ contains the ERROR label in the given program.

Let $V_i, V_{i+1}$ denote the state of program variables before and after executing the basic block $b_i$ respectively. We say Tr is feasible iff there is a real execution of the concrete program which follows the same sequence of basic blocks as Tr. The simulation step checks the feasibility of Tr by checking the satisfiability of the following equation $$Sim(Tr) := T_{b_1}(V_1, V_2) \land T_{b_2}(V_2, V_3) \land \ldots \land T_{b_k}(V_k, V_{k+1}) \quad (2)$$

: Assertion. The trace Tr is feasible iff Sim(Tr) is satisfiable. Let ST sim(Tr) denote the simulation equation when the strengthened transition relation is used.

$$Sim(Tr) := ST_{b_1}(V_1, V_2) \land ST_{b_2}(V_2, V_3) \land \ldots \land ST_{b_k}(V_k, V_{k+1}) \quad (3)$$

The following Assertion states that using the strengthened transition relation for simulation of abstract counterexamples is sound. That is, if Tr is a real counterexample (feasible), then ST sim(Tr) is satisfiable, and if Tr is infeasible, then ST sim(Tr) is unsatisfiable.

Assertion. Simulation soundness: Tr is feasible iff ST sim (Tr) is satisfiable.

Let Tr be an infeasible trace when no invariants are used, then Tr is also infeasible when the strengthened transition relation is used (above assertion). However, with strengthening it is possible that a sub-sequence Tr' of Tr is itself infeasible. In this case the refinement can be done by looking at only Tr' and the invariants that hold along Tr'. Earlier, we presented an example where the length of infeasible trace is reduced from 10 to 1 by using the strengthened transition relation. This in turn allows refinement with fewer predicates per program location.

Invariants for Transition Relation Strengthening

The octagon abstract domain allows the representation and manipulation of octagonal invariants, which have the form $\pm x \pm y \leq c$, where x,y are numerical variables and c is a numerical constant. The octagon abstract domain allows the representation of octagonal relationships between n program variables with $O(n^2)$ memory cost. In order to compute octagonal relationships various abstract operators (transfer functions) are needed.

The octagon abstract domain provides all the required operators with worst case $O(n^3)$ time cost. We selected octagonal invariants for transition relation strengthening because they can be computed efficiently and are expressive enough to capture many commonly occurring variable relationships and simple loop invariants, important for checking standard properties such as array bounds violation. However, strengthening can also be carried out using other more expressive classes of invariants. Issues involved in the generation and usage of octagonal invariants are discussed below.

Octagon Packing for Invariant Generation

Computing octagonal relationships between n variables has $O(n^2)$ memory cost per program location and $O(n^3)$ time cost per transfer function. This can become prohibitive when n is large. In Astr'ee, the set of program variables is clustered into various sets of related variables, known as octagon packs. The octagonal relationships are computed separately for each octagon pack. The size of each octagon pack is kept small so that the computation of octagonal relationships between the variables in an octagon pack is fast. Octagon packing trades off accuracy of generated invariants for speed, and thus, choosing a right packing strategy is important for the generated invariants to be useful.

We have experimented (Section 5.2) with the following octagon packing techniques.

Basic block based packing: We implemented the octagon packing technique used in Astr'ee. An octagon pack is associated with each basic block of the control flow graph. All the variables occurring in a basic block (excluding non-linear terms) are made a part of the octagon pack associated with the basic block. If the basic block is a part of a while, or if-then-else structure, then the variables appearing in the condition of the while or if-then-else structure are made a part of the octagon pack.

Control flow based packing: We propose a new packing technique that associates an octagon pack with each condition in the control flow graph. Let oct(c) denote the octagon pack corresponding to a condition c at program location l. All numerical variables occurring in c are made a part of oct(c). Then a backward traversal of the control flow graph is done starting from l. Whenever any variable in oct(c) is updated through an assignment, the variables appearing in the assigned expression are added to oct(c). Thus, the variables in oct(c) affect the value of condition c either directly or indirectly.

Invariant Selection for Strengthening

For each octagon pack the octagonal relationships between the variables appearing in it are tracked at every basic block. This can result in a large number of octagonal invariants at every basic block. Using all the invariants that hold at a basic block for strengthening can make the predicate abstraction computation and simulation of counterexamples more expensive as compared to not using the invariants. Therefore, we apply a heuristic to filter out invariants that are not deemed important.

Let I be an octagonal invariant that holds at the entry to a basic block b. Let needed(b,E) denote the set of variables whose values need to be tracked at basic block b for checking the reachability of a given error label E. We compute needed (b,E) at each basic block b by performing a syntactic cone-of-influence computation starting from E. We use the following heuristic for selecting the invariants for use in transition relation strengthening:

InvSelect: Use I to strengthen the basic block b only if all variables appearing in I are present in needed(b,E).

Experimental Results

We have implemented these techniques in NEC's F-SOFT verification tool. FSOFT allows checking the C code for user specified (assert statements) or standard properties (array bound violations, NULL pointer dereferences, use of uninitialized variables). Details about the software modelling in F-SOFT can be found in.

For our experiments, we used a 2.8 GHz dual-processor Linux machine with 4 GB of memory for experiments. Before the abstraction refinement loop starts, we pre-compute the octagonal relationships using the octagon abstract domain library. We use a SAT solver for computing the predicate abstraction and simulation of counterexamples. We report results on TCAS and internal benchmarks. TCAS (Traffic Alert and Collision Avoidance System) is an aircraft conflict detection and resolution system. We used an ANSI-C version of a TCAS component which is known to be widely available from the Georgia Tech University.

Even though the preprocessed program has only 224 reachable basic blocks, the number of predicates needed to verify the properties is non-trivial for both F-SOFT and BLAST. We checked 10 different safety properties of the TCAS system using predicate abstraction. None of these properties can be verified by using the octagonal invariants alone. We also analyzed 45 internal industrial benchmarks SW-1, . . . , SW-45 for standard property violations. Some of these benchmarks have more than 1000 reachable basic blocks.

Use of Octagonal Invariants during Predicate Abstraction and Refinement

Table 1 presents a comparison between three different implementations of the predicate abstraction and refinement loop. The "Default" column uses the localization of predicates. This means that instead of maintaining a global set of predicates, localized predicates relevant to various basic blocks of the program are discovered by weakest pre-condition propagation along infeasible program traces.

The "Strengthen" column uses the same framework as the "Default" technique. However, it uses the strengthened transition relation for each basic block in the various steps of the abstraction refinement loop. The strengthening is carried out using the octagonal invariants, which are pre-computed using the octagon abstract domain.

We use control flow based packing for invariant generation and InvSelect heuristic for invariant selection. Generation of octagonal invariants took five seconds for the TCAS benchmark. The "BLAST" column presents the results of running the BLAST software model checker with the Craig interpolation options.

We ran BLAST with craig2 and predH7 options. The "Time" sub-column presents the total time taken by the abstraction and refinement loop when checking a given property. For the "Default" and "Strengthen" techniques the breakup of total time ("Time") is presented in the "Abs", "MC", and "SR" sub-columns. The "Abs" sub-column gives the total time spent in computing the predicate abstraction, the "MC" sub-column is the total time spent in model checking the abstracted program, the "SR" sub-column is the total time spent on the simulation of abstract counterexamples and refinement. The "Preds" sub-column provides two numbers separated by a slash: 1) Total number of predicates present in the last iteration of abstraction refinement loop. 2) Maximum number of predicates tracked at a given program location. The "Cex" sub-column provides the average length of infeasible traces that were given to the refinement procedure for generating new predicates. The "I" sub-column gives the total number of abstraction refinement iterations.

Reduction in the number of predicates: Observe that the strengthened transition relation ("Strengthen" column) allows checking the given properties with fewer predicates (first number in "Preds" column) on 9 out of 10 properties. Since all the three implementations use localization of predicates, the size of the abstract models produced can be exponential in the maximum number of predicates tracked at any program location. This is the second number in "Preds" column and it is smallest for the "Strengthen" column on 9 out of 10 properties as compared to both "Default" and "BLAST". As a result, the total time spent on model checking the abstractions ("MC" sub-column) is smaller by 55% on average when using the strengthened transition relation as compared to the "Default" technique.

Reduction in the length of infeasible traces: The "Cex" column shows the average length of infeasible traces that were given to the refinement procedure. This number is consistently smaller when using the strengthened transition relation as compared to the "Default" technique. When refining an infeasible trace consisting of basic blocks $b_1, \ldots b_k$ new predicates are discovered at each basic block $b_i$ by the refinement procedure. Smaller infeasible traces were refined in the "Strengthen" case leading to fewer predicates as compared to the "Default" case.

Impact on running time: The significant reduction in the model checking time, enables "Strengthen" to outperform other techniques ("Default" and "BLAST") in terms of total time ("Time") on a majority of properties.

Results on SW-* benchmarks: We checked these benchmarks for standard property violations using "Default" and "Strengthen" techniques. Since the standard property checks are added automatically through control flow graph modification comparison with BLAST was not possible. The results on few SW-* benchmarks is summarized in Table 2.

The meaning of the various columns in Table 2 is same as in Table 1. We observed an average reduction in the total number of abstraction refinement iterations (by 54%), maximum number of predicates tracked at a program location (by 58%), overall runtime (by 69%) as compared to "Default".

Generation of Invariants

We may describe results for the two different octagon packing techniques discussed earlier. For both basic block based packing and control flow based packing we limit the size of each octagon pack to 10. That is no more variables are added to an octagon pack once its size exceeds 10.

Table 3 presents the comparison between the block based packing and control flow based packing and their impact on the invariant generation. Only the results for few SW-* benchmarks are reported in this table. The "BB" column gives the total number of basic blocks in the benchmark, the "Prop" column gives the total number of safety properties (reachability of labeled error statements, or automatically generated standard property monitors) in a benchmark. The "Block" column presents the results for the basic block based packing and the "Control flow" column presents results for the control flow based packing.

The subcolumn "Time" gives the total time required to compute the invariants for the octagon packs generated using a given packing technique. The "PackStats" column presents three numbers separated by a slash (/): total number of distinct octagon packs, maximum number of variables in an octagon pack, and average number of variables in an octagon pack. The "Done" column shows the number of safety properties ("Prop" column) that can be proved by using the octagon invariants only. The "NumInv" column presents two numbers separated by a slash (/): total number of invariants generated, and the total number of non-redundant invariants. For example, the "NumInv" entry for the following set of invariants will be 3/2: $\{x \leq 1, y \leq 1, x+y \leq 2\}$. Here, $x+y \leq 2$ is expressible in terms of $x \leq 1$ and $y \leq 1$.

Discussion of octagon packing results: The control flow based packing produces consistently less number of octagon packs as compared to the basic block based packing. This is expected as the number of octagon packs is proportional to the number of basic blocks in basic block based packing, and proportional to the number of conditions in the program in control flow based packing. The maximum and the average number of variables tracked in an octagon pack is smaller in the control flow based packing technique. Thus, the time taken to compute invariants using the control flow based packing is smaller (by 2.8× on average) as compared to the basic block based packing.

In order to compare the quality of invariants generated using the two packing techniques we did two experiments: First, we looked at the number of safety properties shown correct by the use of octagonal invariants themselves. This number is shown in the "Done" column.

We observed that the number of safety properties proved correct by basic block based packing was always a subset of or the same as those proved correct using control flow based packing. Second, we used the generated invariants inside the predicate abstraction and refinement loop by transition relation strengthening. We found the addition of octagonal invariants generated (using either packing technique) to enable checking a given property with fewer predicates, as compared to not using the invariants.

However, the addition of invariants generated using basic block based packing increased the predicate abstraction computation and refinement times significantly causing an overall increase in runtimes, as compared to not using invariants. For the TCAS benchmark, an average of 8.6 invariants were added to each basic block when using the basic block based packing, as compared to an average of 1.9 invariants when using control flow based packing. As fewer invariants are added to each basic block with control flow based packing, the increase in abstraction computation and refinement times is much less as compared to using the basic block based packing.

Why control flow based packing is useful. In many tools the generation of new predicates for abstraction refinement is done by computing the weakest pre-conditions of the conditions present in the control flow graph. Suppose the weakest pre-condition of a condition c for a certain number of steps results in predicates $p_1, \ldots p_n$. Let pvars denote the set of variables appearing in the predicates $p_1, \ldots p_n$ and condition c. Let vars(c) denote the octagon pack corresponding to condition c in the control flow based packing. If the size of vars(c) is not restricted, then it is the case that pvars $\subseteq$ vars(c). Thus, the octagon packs computed using control flow based packing tend to cluster those variables for which relationships will be discovered later (through refinement) as new predicates and their weakest pre-conditions. Eagerly computing the relationships for such clusters and using them in the predicate abstraction and refinement loop, thus, attempts to get most benefit out of the efficiently computable invariants.

Invariant Selection for Strengthening

After invariant generation there can be many octagonal invariants that hold at each program location. Using all invariants that hold at program location l to strengthen the transition relation at l may not be beneficial. This is because providing too many additional relationships in form of invariants may increase the time required for abstraction computation and simulation of abstract counterexamples, as compared to not using the invariants. The impact of the invariant selection heuristic InvSelect described earlier on the number of invariants that get selected for strengthening is summarized in Table 4.

The "Default" column shows the statistics before InvSelect selection heuristic is applied. The "InvSelect" column gives the statistics after InvSelect selection heuristic is applied. The sub-column "Tot" gives the total number of invariants that get selected, the "Max" sub-column gives the maximum number of invariants selected at a basic block, and the "Avg" sub-column gives the average number of invariants selected at a basic block.

The invariant selection heuristic InvSelect helps in reducing the number of invariants that get selected at each basic block for transition relation strengthening. For the TCAS benchmark, application of the InvSelect heuristic reduces the average number of invariants available for strengthening a given basic block from 15.4 to 1.9. After invariant generation we always apply InvSelect selection heuristic to filter out invariants that are not deemed important.

Conclusion

It should now be apparent to those skilled in the art that efficiently computable invariants can be used to improve the counterexample-guided abstraction refinement flow such as used in software verification tools using predicate abstraction. The invariants at program location l are selectively added to the concrete transition relation at l to obtain a strengthened transition relation at l. Using a strengthened transition relation in the predicate abstraction and refinement loop can lead to the creation of more precise abstract models leading to fewer and shorter infeasible traces. This can allow checking a given property with fewer predicates. More importantly, this technique can help in checking properties where using the standard predicate abstraction and refinement loop alone will take too long to converge (for example, properties depending on loop invariants). Advantageously, and according to our experimental findings, we found a consistent reduction in the total number of predicates, maximum number of predicates tracked at a given program location, and the overall verification time.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

TABLE 1

| Benchmark | Default | | | | | | | Strengthen | | | | | | | BLAST | | |
|---|---|---|---|---|---|---|---|---|---|---|---|---|---|---|---|---|---|
| | Time | Abs | MC | SR | Preds | Cex | I | Time | Abs | MC | SR | Preds | Cex | I | Time | Preds | I |
| tcas1a | 87 | 19 | 40 | 28 | 93/31 | 11 | 38 | 51 | 15 | 12 | 24 | 65/21 | 7.4 | 28 | 102 | 81/24 | 35 |
| tcas1b | 386 | 49 | 266 | 71 | 137/56 | 20 | 54 | 333 | 58 | 177 | 98 | 126/49 | 16 | 50 | 278 | 108/36 | 69 |
| tcas2a | 87 | 18 | 41 | 30 | 94/36 | 11.3 | 38 | 48 | 15 | 11 | 22 | 57/18 | 7.1 | 26 | 112 | 97/29 | 38 |
| tcas2b | 95 | 20 | 41 | 34 | 99/34 | 13.1 | 39 | 100 | 26 | 27 | 47 | 78/27 | 11.6 | 37 | 177 | 106/31 | 52 |
| tcas3a | 164 | 25 | 96 | 43 | 113/48 | 13.4 | 40 | 131 | 27 | 51 | 53 | 89/31 | 11.4 | 36 | 217 | 130/37 | 57 |
| tcas3b | 56 | 11 | 26 | 19 | 82/27 | 9.9 | 28 | 69 | 18 | 19 | 32 | 64/21 | 8.9 | 28 | 92 | 99/26 | 33 |
| tcas4a | 334 | 51 | 199 | 84 | 122/45 | 14.7 | 40 | 167 | 33 | 70 | 64 | 97/33 | 13 | 40 | 515 | 158/48 | 104 |
| tcas4b | 130 | 27 | 54 | 49 | 88/28 | 11.2 | 32 | 90 | 25 | 24 | 41 | 77/22 | 10.6 | 32 | 303 | 127/36 | 47 |
| tcas5a | 113 | 26 | 40 | 47 | 96/28 | 10.3 | 32 | 27 | 9 | 6 | 12 | 46/12 | 6.6 | 17 | 100 | 87/21 | 29 |
| tcas5b | 149 | 29 | 69 | 51 | 98/29 | 10.4 | 30 | 87 | 23 | 27 | 37 | 75/22 | 9.2 | 25 | 139 | 102/27 | 39 |

TABLE 2

| Benchmark | Default | | | | | | Strengthen | | | | | |
|---|---|---|---|---|---|---|---|---|---|---|---|---|
| | Time | Abs | MC | SR | Preds | I | Time | Abs | MC | SR | Preds | I |
| msg-len | 29.1 | 8.3 | 2.3 | 18.5 | 53/17 | 14 | 9.3 | 2.9 | 0.5 | 5.9 | 16/4 | 6 |
| prm-pmasnl | 42.4 | 10.5 | 3.5 | 28.4 | 53/17 | 14 | 9.1 | 2.8 | 0.5 | 5.8 | 16/4 | 6 |
| tr-id-free | 1.9 | 0.8 | 0.3 | 0.8 | 16/14 | 5 | 3.0 | 0.8 | 0.3 | 1.9 | 16/14 | 5 |
| ttsrch-rnc | 109.4 | 94 | 4.8 | 10.6 | 58/22 | 11 | 6.3 | 2.6 | 0.0 | 3.7 | 11/4 | 3 |

TABLE 3

| Benchmark | | | | Block | | | Control Flow | | | |
|---|---|---|---|---|---|---|---|---|---|---|
| | BB | Prop | Time | PackStats | Done | NumInv | Time | PackStats | Done | NumInv |
| tcas | 224 | 10 | 18s | 72/10/4.9 | 0 | 11196/5121 | 5s | 49/5/2.7 | 0 | 3992/3456 |
| SW-1 | 1587 | 295 | 190s | 252/8/4.1 | 76 | 83478/38654 | 87s | 180/6/1.5 | 90 | 35042/23431 |
| SW-2 | 1986 | 592 | 264s | 256/10/4.4 | 111 | 72972/50973 | 132s | 203/6/1.5 | 131 | 58801/48612 |
| SW-3 | 2440 | 542 | 576s | 472/9/4.2 | 82 | 167738/87738 | 270s | 310/9/1.5 | 82 | 105184/66130 |
| SW-4 | 1472 | 402 | 237s | 226/10/4.2 | 64 | 115254/90541 | 59s | 132/8/2 | 64 | 98514/83096 |

TABLE 4

| Benchmark | Default | | | Block | | |
|---|---|---|---|---|---|---|
| | Tot | Max | Avg | Tot | Max | Avg |
| tcas | 3456 | 24 | 15.4 | 441 | 12 | 1.9 |
| SW-1 | 23431 | 43 | 18 | 2825 | 14 | 2.2 |
| SW-2 | 48612 | 34 | 20.7 | 3307 | 8 | 1.4 |
| SW-3 | 66130 | 58 | 23.4 | 5068 | 14 | 1.8 |
| SW-4 | 83096 | 73 | 56.5 | 14844 | 31 | 10.1 |

What is claimed is:

1. A computer-implemented method for verifying a software program having a plurality of code statements, the method comprising the steps of:
 determining one or more properties of the software program to be verified;
 generating a model of the software program
 producing a predicate abstraction of the modeled software program;
 checking the abstracted model for correctness;
 generating an indication of the correctness; and
 refining the predicate abstraction by adding predicates, and checking the refined, abstracted model for correctness until no spurious counterexamples are produced;
 outputting an indication that the properties are satisfied or that the properties are disproved;
 wherein
 predicates are statement-specific localized to a basic block wherein a localized predicate exhibits a limited lifetime and never exists in all blocks of the program, wherein a basic block is represented by a single node of a control flow graph (CFG) and said predicates are determined using weakest pre-condition propagation along infeasible paths such that a plurality of calls made to any decision procedure when computing an abstraction of the software are eliminated.

2. The verification method of claim 1 wherein:
 a faster model checking of the computed abstract software model is produced by sharing abstract variables thereby reducing the size of the software system being verified.

3. The verification method of claim 2 wherein:
 a determination is made whether a certain predicate is useful in heuristically-determined, large parts of the software system.

4. The software verification method of claim 3 wherein:
 certain predicates are assigned a dedicated abstract variable without sharing, based upon the determination made about the predicates' usefulness in large parts of the software system.

* * * * *